United States Patent [19]

Piltch et al.

[11] 4,011,462

[45] Mar. 8, 1977

[54] PULSED INFRARED DIFFERENCE FREQUENCY GENERATION IN $CdGeAs_2$

[75] Inventors: Martin S. Piltch; John P. Rink; Charles R. Tallman, all of Los Alamos, N. Mex.

[73] Assignee: The United States of America as represented by the United States Energy Research and Development Administration, Washington, D.C.

[22] Filed: Nov. 26, 1975

[21] Appl. No.: 635,457

[52] U.S. Cl. .............................. 307/88.3; 330/4.5
[51] Int. Cl.$^2$ ........................................ H02M 5/04
[58] Field of Search ................................. 307/88.3

[56] References Cited

UNITED STATES PATENTS 3,869,618   3/1975   Lax et al. ................. 307/88.3

Primary Examiner—Siegfried H. Grimm
Assistant Examiner—Darwin R. Hostetter
Attorney, Agent, or Firm—Dean E. Carlson; Robert W. Weig; Jerome B. Rockwood

[57] ABSTRACT

The disclosure relates to a laser apparatus for generating a line-tunable pulsed infrared difference frequency output. The apparatus comprises a $CO_2$ laser which produces a first frequency, a CO laser which produces a second frequency and a mixer for combining the output of the $CO_2$ and CO lasers so as to produce a final output comprising a difference frequency from the first and second frequency outputs.

3 Claims, 1 Drawing Figure

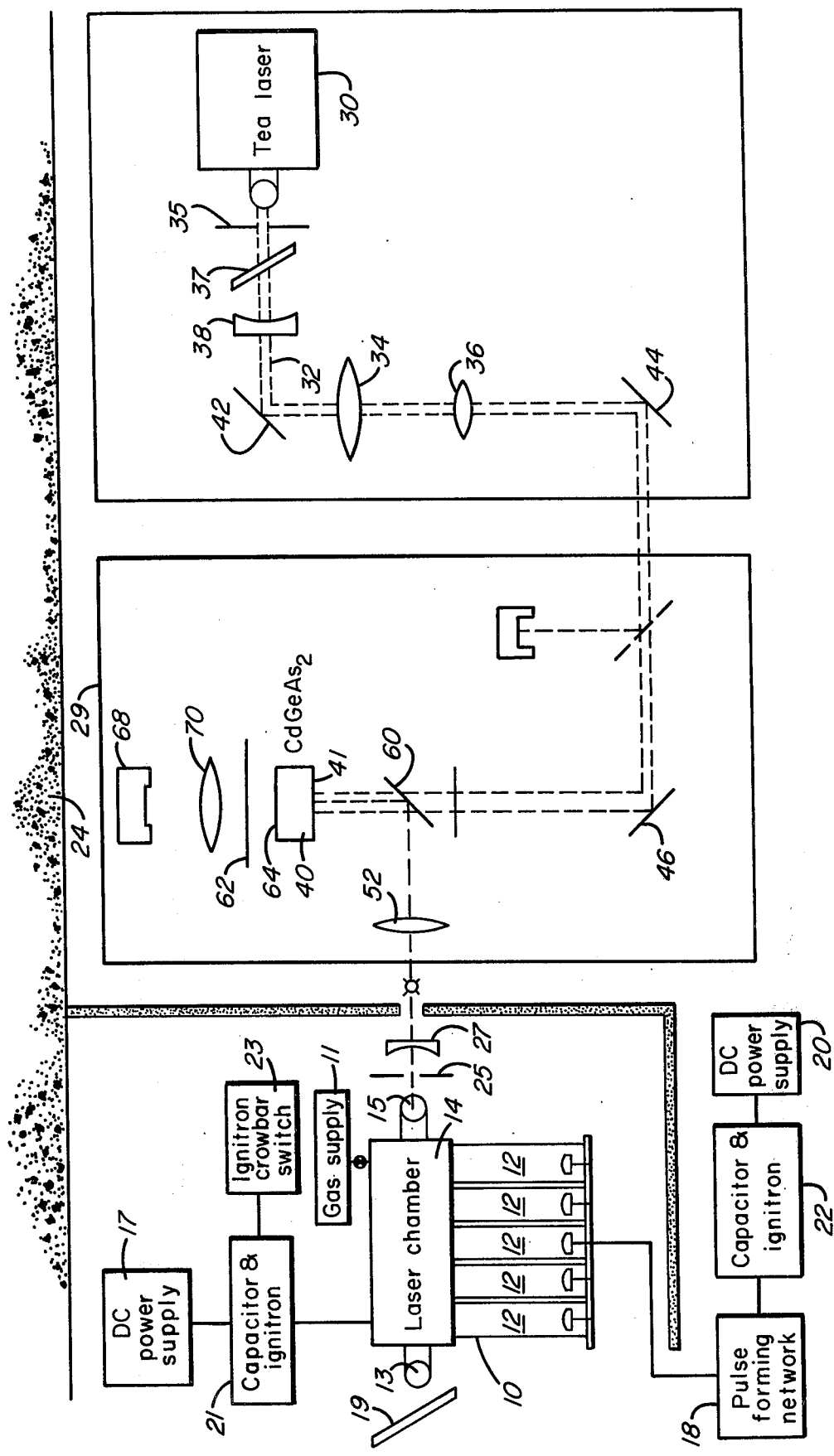

PULSED INFRARED DIFFERENCE FREQUENCY GENERATION IN $C_2G_2A_2$

The invention described herein was made in the course of, or under, a contract with the U.S. Energy Research and Development Administration.

The invention relates to pulsed gas lasers and more particularly to an apparatus for generating a line-tunable pulsed difference frequency output using CO and $CO_2$ lasers.

For laser isotope separation the ability to tune a laser to a desired frequency is needed.

In accordance with a preferred embodiment of the present invention, there is provided a laser apparatus for generating a pulsed difference first frequency output comprising a first laser having an output of a first frequency, a second laser having an output of a second frequency, and a mixer incorporating a crystal for mixing the outputs of the first laser and of the second laser to produce a final output comprising a difference frequency of the first and second frequencies. In one embodiment, the first laser comprises an electron beam pre-ionized CO laser and the second laser comprises a $CO_2$ TEA laser. In addition, the difference frequency is line-tunable, and is preferably within the infrared range. The preferred embodiment utilizes a chalcopyrite single crystal or a combination of zinc-blende crystals. Filters may be utilized to remove unwanted frequencies from the final output.

One object of the present invention is to produce a line-tunable output within a desirable frequency range.

Another object of the present invention is to provide a difference frequency output utilizing first and second lasers each having different frequency outputs. One advantage of the invention is that an apparatus in accordance therewith can attain frequencies hitherto not generated.

Other objects and advantages in accordance with the present invention will be recognized by those skilled in the art from the following description with reference to the appended drawing, wherein like numbers denote like parts and wherein:

The FIGURE illustrates a preferred embodiment of the invention.

Reference is now made to the FIGURE. As shown therein, a CO laser 10, which is preferably an electron beam pre-ionized CO laser, employs five plasma diode cathodes 12 which deliver pre-ionization electrons to a laser gas mixture 14 supplied by gas supply 11 to a laser cavity 16. In an exemplary apparatus, the plasma diodes 12 were 10 centimeters (cm) in diameter and spaced as closely as possible in order to provide uniform pre-ionization to a 2.5 cm high × 2.0 cm wide × 45 cm long interelectrode volume. The plasma diodes operated at a pressure of 0.055 torr of helium and were energized by a 120 kilovolt (kV) pulse forming network 18 which supplied a 70 microsecond duration pulse. Pulse forming network 18 was powered by DC power supply 20 and ignitron and capacitor bank 22. In CO laser 10 the laser gas mixture 14 comprised 85% argon and 15% high purity CO at a total pressure of 280 torr. This gas mixture was excited by a capacitor bank 21 switched by ignition crowbar switch 23 operating at 3 kV and powered by a DC power supply 17. Brewster angle windows 13 and 15 were disposed at either end of chamber 14. A laser mode control aperture 25 and a laser output coupler 27 were located as illustrated to process the output of CO laser 10 for entry into a laser beam mixer 29.

The gas electrical loading was in the range of 2000 joules per liter-atmosphere of CO molecules and the laser was line-tunable with an intracavity original ruled grating 19 having 150 lines per millimeter (mm). CO laser 10 was found capable of operation at wavelengths from about 5.3 to about 6.1 microns with a single line output. CO laser 10 exhibited single transverse mode energies of typically 50 millijoules during 50 microsecond output pulses. Those skilled in the art will appreciate CO laser 10 was encompassed within an x-ray shield (not shown) for safety consideration.

A $CO_2$ laser 30 was a Lumonics type 103 double discharge laser employing an intercavity diffraction grating of 30 × 50 mm with 50 lines/mm blazed at 10 $\mu$m for line tunability. Laser 30 was operated at a pressure of about 580 torr with a nitrogen rich mixture of 4:2:1; $He:N_2:CO_2$ and produced an output pulse of 2 microsecond duration. Laser 30 operated at a typical single line, transverse mode output energy of about 300 to about 500 millijoules with no evidence of spontaneous modelocking. Lasers 10 and 30 were both operated at a repetition rate of approximately 1 pulse per second in producing the desired final output of the invention.

In order to achieve maximum nonlinear conversion efficiency and to remain below the threshold for damage to a mixing crystal 40, the two laser beams were processed somewhat differently before being allowed to impinge on the crystal 40. This crystal 40 comprised a positive uniaxial chalcopyrite $CdGeAs_2$ and the threshold for damage appeared to be less than 10 megawatts per centimeter squared ($MW/cm^2$). After emerging from a Brewster window 35, beam 32 from $CO_2$ laser 30 was reduced to about 0.5 cm in diameter with an inverted telescope comprising ZnSe lenses 34 and 36. Mirror 38 is part, along with the diffraction grating, of the $CO_2$ laser cavity. Mirrors 42, 44, and 46 were used to direct the beam 32 on a desired path. An output beam 50 for CO laser was brought to a focus 2 cm in front of crystal 40 with a 30 cm focal length ZnSe lens 52. The beams 50, and 32 from lasers 10 and 30, respectively, were spatially combined with a Ge dielectric coated dichroic beam splitter 60 before impinging on the crystal 40. At the crystal surface the $CO_2$ laser intensity was kept below about 0.5 $MW/cm^2$ the CO laser intensity was on the order of 0.2 $MW/cm^2$. At these intensity levels, no damage was observed to the crystal after a total of some 500,000 pulses.

Proper laser polarizations for the phase matching in the positive uniaxial crystal 40 were assured by the proper orientation of conventionally located Brewster angle windows in each laser. Within crystal 40, the CO laser beam 32 propagates as an ordinary wave while the $CO_2$ laser beam 50 propagates as an extraordinary wave. As is well known to those of ordinary skill in the art, an ordinary ray is not polarization dependent in index, whereas a extraordinary ray's index is polarization dependent. In an exemplary crystal 40, entrance face 41 of crystal 40 is cut and polished such that at normal incidence the lasers propagate in a direction essentially 50° to the crystal axis. The crystal has dimensions of 5 × 10 × 10 mm and there are no antireflection coatings on either the entrance or exit (5 × 10 mm) faces. After the beams 32 and 50 pass through the crystal 40 so that nonlinear mixing occurs, the final output for crystal 40 is preferrably filtered using two multi-layer filters 62 and 64 to block or remove any largely unconverted 5 and 10 micron radiation. Filters 62 and 64 essentially block wavelengths of shorter than 10 microns with a total attenuation of approximately $10^6$. The filtered final output beam is collected and focused on a detector 68 with a ZnSe lens 70. The detector actually utilized in the exemplary apparatus was a HgCdTe photovoltaic detector peaked for maximum sensitivity at 16 microns and maintained at about 77° K. For wavelength measurements a 0.5 meter Jarrel-Ash monochromator (not shown) was used in combination with the detector 68. Energy measurements were made with a Laser Precision high sensitivity joulemeter, Type AK-2900.

The results of one experiment can be summarized by the following—for CO and $CO_2$ lasers having powers of 1 KW and 200 KW, respectively, a useable output in the 16 micron wavelength range of 2.5 watts was measured at the output crystal face.

The measured mixed signal power can be most easily compared to analytical predictions with the aid of the following relationship. The formula is derived assuming no depletion of either of the pump waves and is couched in hybrid, but commonly used units.

$$I_3 = \frac{52.2 \; d^2 L^2 I_1 I_2}{n_1 n_2 n_3 \lambda_3^2} \left( \frac{\sin x}{x} \right)^2,$$

where $I_1, I_2, I_3$ are the intensities of the mixed signal and the pumping signals, respectively $$\left( \frac{\text{watts}}{\text{cm}^2} \right),$$

$n_3, n_2, n_1$ are the indices of refraction of the crystal for these signals, $\lambda_3$ is the difference wavelength (cm), $\lambda_2$ and $\lambda_1$ are the pump wavelengths, $d$ is the relevant effective nonlinear coefficient $$\left( \frac{\text{cm}}{\text{statovolt}} \right),$$

L is the crystal length
and $$\text{and } x = \pi \frac{n_3}{\lambda_3} - \frac{n_2}{\lambda_2} - \frac{n_1}{\lambda_1} L.$$

Correction factors must be applied to account for (1) the large Fresnel reflection (31%) at each of the crystal surfaces; (2) the linear crystal absorption coefficient (0.5 $cm^{-1}$ and 0.2 $cm^{-1}$ measured at the two pump wavelengths and (0.3 $cm^{-1}$) at the mixed wavelength. With these considerations, the measured output is within a factor of two of the predicted output. The remaining discrepancy is attributed to nonreproducible laser transverse mode structure and pulse to pulse output power.

In the preferred embodiment set forth herein, the range of discrete line tunability was found to be from about 15.5 to about 16.5 microns. This is because the crystal was cut to maximize the interaction for difference frequencies in the neighborhood of 16 microns. In practice, those skilled in the art will appreciate that utilizing crystals of various cuts, difference frequency wavelengths of from about 3.5 to about 18 microns are attainable.

It will be appreciated by those skilled in the art that the various combinations of CO and $CO_2$ laser vibrational-rotational transitions make possible dense coverage of the frequency band from about 8 to about 19 microns with difference frequencies spaced less than 0.1 $cm^{-1}$ apart.

The various features and advantages of the invention are thought to be clear from the foregoing description. However, various other features and advantages not specifically enumerated will undoubtedly occur to those versed in the art, as likewise will many variations and modifications of the preferred embodiment illustrated. All of which may be achieved without departing from the spirit and scope of the invention as defined by the following claims.

What we claim is:

1. A laser apparatus for generating a pulsed difference frequency comprising:
   an electron beam, pre-ionized CO laser having a single line output wavelength substantially between 5.0 microns and 6.5 microns;
   a $CO_2$ TEA laser having a single line output;
   mixing means for mixing the output of said CO laser and said $CO_2$ laser including a Ge dielectric coated beam splitter and a single crystal of chalcopyrite $CdGeAs_2$ providing a line-tunable difference frequency output; and
   filter means for removing unwanted wavelengths from the output of said mixing means, producing an output wavelength discretely line-tunable between substantially 3.5 microns to substantially 18 microns spaced less than 0.1 $cm^{-1}$ apart.

2. The invention of claim 1 wherein said CO laser includes a ruled diffraction grating having substantially 150 lines per millimeter to enable line-tuning of said CO laser.

3. The invention of claim 1 wherein said $CO_2$ TEA laser includes a ruled diffraction grating having substantially 50 lines per millimeter to enable line-tuning of said $CO_2$ TEA laser.

* * * * *